May 19, 1925.  1,537,968
H. M. SCHNABEL
BATTERY CONNECTER
Filed Feb. 21, 1921
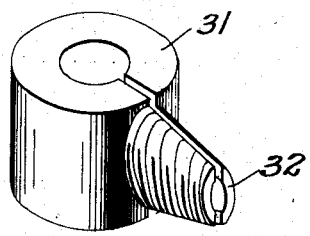
Fig. 1.
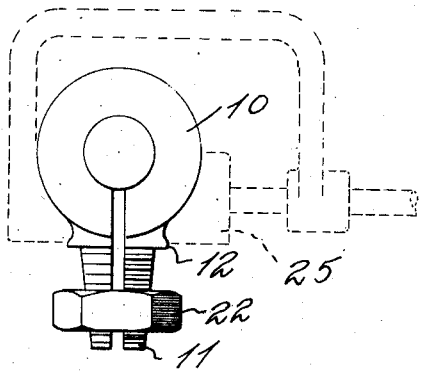
Fig. 2.
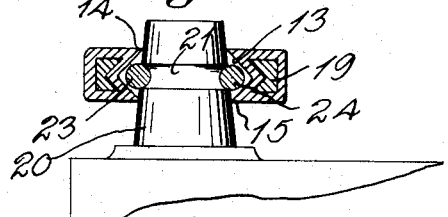
Fig. 3.
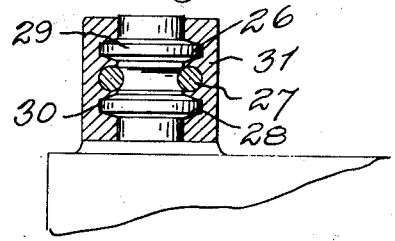
Fig. 5.
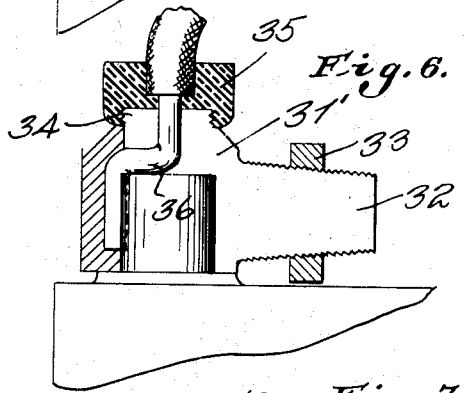
Fig. 6.
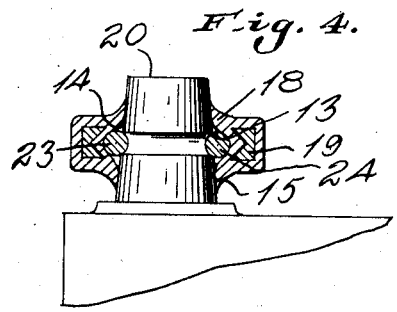
Fig. 4.
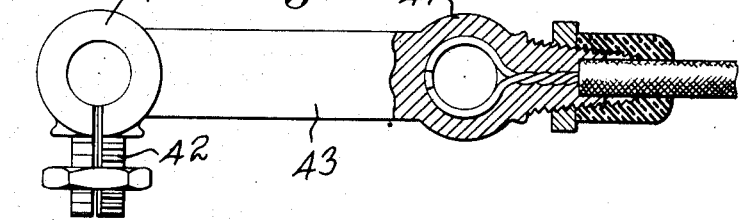
Fig. 7.
Fig. 8.
Inventor
Henry M. Schnabel
By his Attorney Patented May 19, 1925.

1,537,968

UNITED STATES PATENT OFFICE.

HENRY M. SCHNABEL, OF GREENWICH, CONNECTICUT.

BATTERY CONNECTER.

Application filed February 21, 1921. Serial No. 446,819.

*To all whom it may concern:*

Be it known that I, HENRY M. SCHNABEL, a citizen of the United States, and resident of the city of Greenwich, county of Fairfield, State of Connecticut, have invented certain new and useful Improvements in Battery Connecters, of which the following is a specification.

The principal object of this invention is to provide a battery connecter that does not require to be burned onto the battery terminal, and while I appreciate the advantages of the close and intimate contact made possible by the burning process I believe that a contact of equal electrical value can be produced in a manner other than that of burning.

One of the chief difficulties in connecting conductors to storage batteries is that of sulphation resulting from the sulphuric acid fumes from the electrolyte attacking copper, iron, brass or in fact any metal other than lead and even under some conditions sulphating and weakening the lead itself and it has been found necessary because of the resistance of lead to attack from sulphuric acid to employ lead in all battery connections. With this in mind I have designed a connecter adapted to be mechanically connected to a battery terminal and adapted to secure a copper wire or other conductor to the battery terminal in such a manner that not only will the electrical connection be as efficient as that produced by burning but I have so designed my connecter that the electrical conductor may be included therein fully incased in lead and in such a manner that the connecter and wire conductor may be removed or replaced at will and without difficulty and without destroying the connecter, the conductor or the battery terminal.

Other objects of my invention will be fully set forth as the specification progresses and with these objects in mind the following is what I consider the best means of carrying out my invention and the accompanying drawings should be referred to for a complete understanding of the specification which follows.

Fig. 1 shows a perspective view of an embodiment of my invention.

Fig. 2 is a plan view showing means for placing the device.

Fig. 3 shows a similar device in position.

Fig. 4 shows in section the device secured.

Fig. 5 shows in section the construction shown in Fig. 1.

Fig. 6 is a sectional view of a still further modification.

Fig. 7 is a plan view partly in section of a bridging connecter.

Fig. 8 is a cross section of the projection.

Similar reference numerals indicate like parts. At 10 I show the body member of my device provided with a projection or boss 11 which may be formed integral therewith and which is provided with screw threads on its exterior.

The boss 11 may be tapered and may have at its point of junction with the ring 10 a shoulder 12 the particular function of which is to receive the pressure of a compressing means in securing the device in position.

The boss 11 and the ring 10 are co-extensively slitted so that when a nut is placed upon the boss 11 it will cause a contraction of the ring to obtain a suitable clamping action thereof.

The interior of the ring is provided with a groove 13 and adjacent this groove I prefer that there shall be provided angular projections 14 and 15 and it is my desire that the apex of these projections be sharp and of little area so that upon compression of the ring upon a suitable device the sharp apex of the projections will be crushed downward or outward. The adjacent walls of the boss or projection 11 may also be provided with tongue and groove 16 and 17 or other over-lapping members, the object being to seal each connection or point of junction between the parts of this device and between the device and any object to which it may be attached.

The effect of the crushing action above described is shown at 18 in Fig. 4 and for purpose of strengthening the construction of my device I may provide a core 19 of hard metal. If the exterior of my device is made of lead the interior or core 19 may be of brass or other suitable metal.

In Fig. 3 I show a battery post 20 adapted to receive my device and in this post 20 I provide a groove 21. The lead wire or conductor to be secured has its insulation removed for a definite length and the strands of the conductor may then be parted and, passing from two directions around the battery post, be brought approximately adjacent. Alternatively the electrical conductor may be arranged in my connecter prior to its introduction upon the battery post the nut 22 being removed from the connecter for this purpose; the conductor wires are then caused to pass into the groove 21 as shown at 23 and 24. A C-clamp or other suitable instrument indicated in dotted lines 25 in Fig. 2 may then be employed to compress the connecter upon the post 20 and to crush downward the sharp edges thereof and the nut 22 may then be returned to secure the connecter and to retain the electrical conductor and the insulation in the manner shown in the right-hand portion of Fig. 7.

The connecter shown in Figs. 1 and 5 has a plurality of grooves 26, 27 and 28 and the battery post may be provided with projections 29 and 30 and when this connecter 31 is secured in position an effective seal will be produced without the crushing of any part of the connecter.

In Fig. 6 I show a connecter 31' having a slitted clamping boss 32 and nut 33 and an additional boss 34 and cap 35 through which the wire 36 may be introduced. This type of connecter may be preferred for some purposes.

Thus far I have referred to a connecter for securing electric wires to batteries. In Fig. 7 I show my device and improvement utilized on a bridging connecter between cells of a battery. In this construction I prefer that the annular members 40 and 41 should be provided with interior grooves as shown in Figs. 3, 4 and 5. The projecting member 42 may however, be without taper and obviously the bridge 43 may be of any desired length and as shown means may be provided in this type of connecter for securing a cable.

Other modifications than those described herein may be made without departing from the principle or sacrificing the advantages of this invention.

Having carefully and fully described my invention, what I claim and desire to secure by Letters Patents is:

1. A battery connecter comprising a ring having a boss, both said ring and said boss being split by one continuous slit, said ring being provided with inwardly extending tapered flanges upon the inner side thereof and a nut adapted to be engaged upon said boss, to secure said ring and to crush said tapered portion against a battery post, when said ring is secured.

2. In a device of the character described, an annular member having a groove in the inner wall thereof, the inner edges of said annular member being of reduced thickness and a screw-threaded member projecting from said annular member, both said annular member and said projection being split by a single continuous slit and said screw-threaded member being provided with a perforation communicating with said groove and a nut adapted to be received upon said projection and to crush the walls of said annular member against a battery post received therein, to partially seal the groove therein.

Signed at the borough of Manhattan, city, county, and State of New York, this 19th day of Feb., 1921.

HENRY M. SCHNABEL.